United States Patent
Gehlot et al.

(10) Patent No.: US 7,145,550 B2
(45) Date of Patent: Dec. 5, 2006

(54) METHOD AND APPARATUS FOR REDUCING REPETITIVE MOTION INJURIES IN A COMPUTER USER

(75) Inventors: Narayan L. Gehlot, Sayreville, NJ (US); Victor B. Lawrence, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 488 days.

(21) Appl. No.: 10/638,112

(22) Filed: Aug. 8, 2003

(65) Prior Publication Data

US 2005/0030323 A1 Feb. 10, 2005

(51) Int. Cl.
*G09G 5/08* (2006.01)
(52) U.S. Cl. ...................... 345/157; 345/156
(58) Field of Classification Search .............. 345/7, 345/8, 156–160, 161–164, 165–166, 169, 345/170, 175, 184; 701/220; 73/504.12; 715/856, 857, 863
See application file for complete search history.

(56) References Cited

U.S. PATENT DOCUMENTS

| | | | | |
|---|---|---|---|---|
| 5,730,151 | A * | 3/1998 | Summer et al. ............ | 600/587 |
| 6,373,961 | B1 * | 4/2002 | Richardson et al. ........ | 382/103 |
| 6,421,064 | B1 * | 7/2002 | Lemelson et al. .......... | 345/688 |
| 6,545,664 | B1 * | 4/2003 | Kim ............................ | 345/158 |
| 6,801,188 | B1 * | 10/2004 | Longobardi ................. | 345/156 |
| 6,922,184 | B1 * | 7/2005 | Lawrence et al. .......... | 345/156 |
| 2002/0163495 | A1 * | 11/2002 | Doynov ...................... | 345/156 |
| 2002/0186200 | A1 * | 12/2002 | Green ......................... | 345/156 |
| 2003/0071787 | A1 * | 4/2003 | Gerstacker ................. | 345/163 |
| 2005/0052412 | A1 * | 3/2005 | McRae et al. .............. | 345/158 |

OTHER PUBLICATIONS http://www.ananova.com/news/story/sm_289469.html, "New software nods the way to the end of the mouse".
http://www.bc.edu/schoolds/csom/eagleeyes/, The Boston College Campus School/EagleEyes Project.
http:/www.csun.edu/cod/conf/1994/proceedings/Wec~htm, Center on Disabilities Virtual Reality Conference 1994, Assistive Cursor Control for a PC Window Environment: Electromyogram and Electroencephalogram Based Control, David W. Patmore et al.
http://cfa165.harvard.edu/software/saoimage/saoimage.mouse.html, SAOimage Mouse control.

* cited by examiner

*Primary Examiner*—Nitin Patel

(57) ABSTRACT

A pointing device is provided for use with a computer, including a tracking device adapted to generate a signal for use by a processor in moving a pointer on screen, and a selecting device adapted generate a selection signal for use by the processor to determine operations to execute. The tracking device and the selecting device are respectively incorporated into at least two distinct apparatuses that are separately operable by different and multiple user body parts. In exemplary embodiments of the invention, the improved pointing device may be operated at least in part by, for example, several of a user's fingers, by a foot, or by a user's eyes. The pointing device thus distributes conventional mouse functions in a way that allows them to be executed by multiple body parts, thereby reducing repeated stress to any single user appendage.

28 Claims, 14 Drawing Sheets

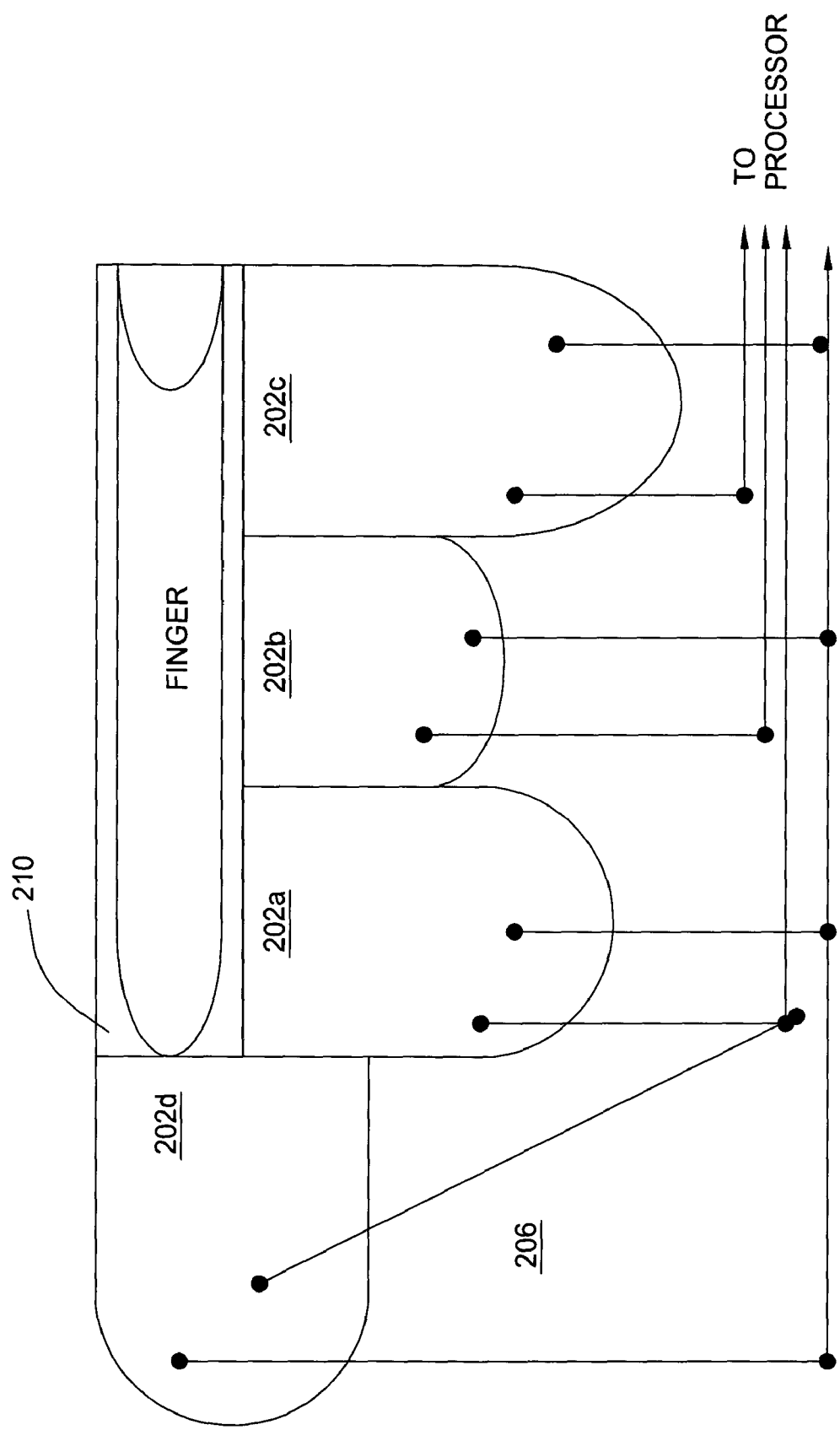

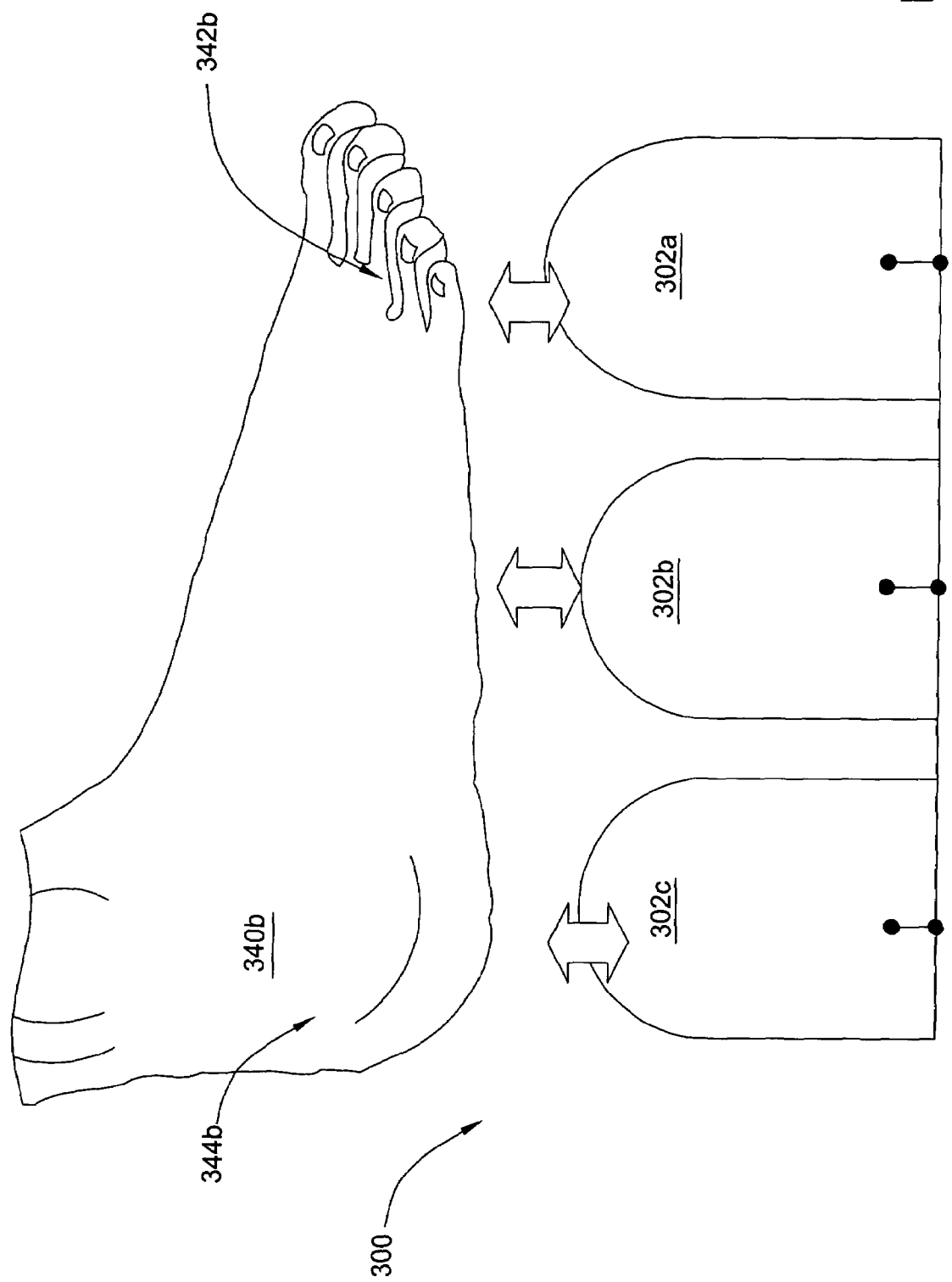

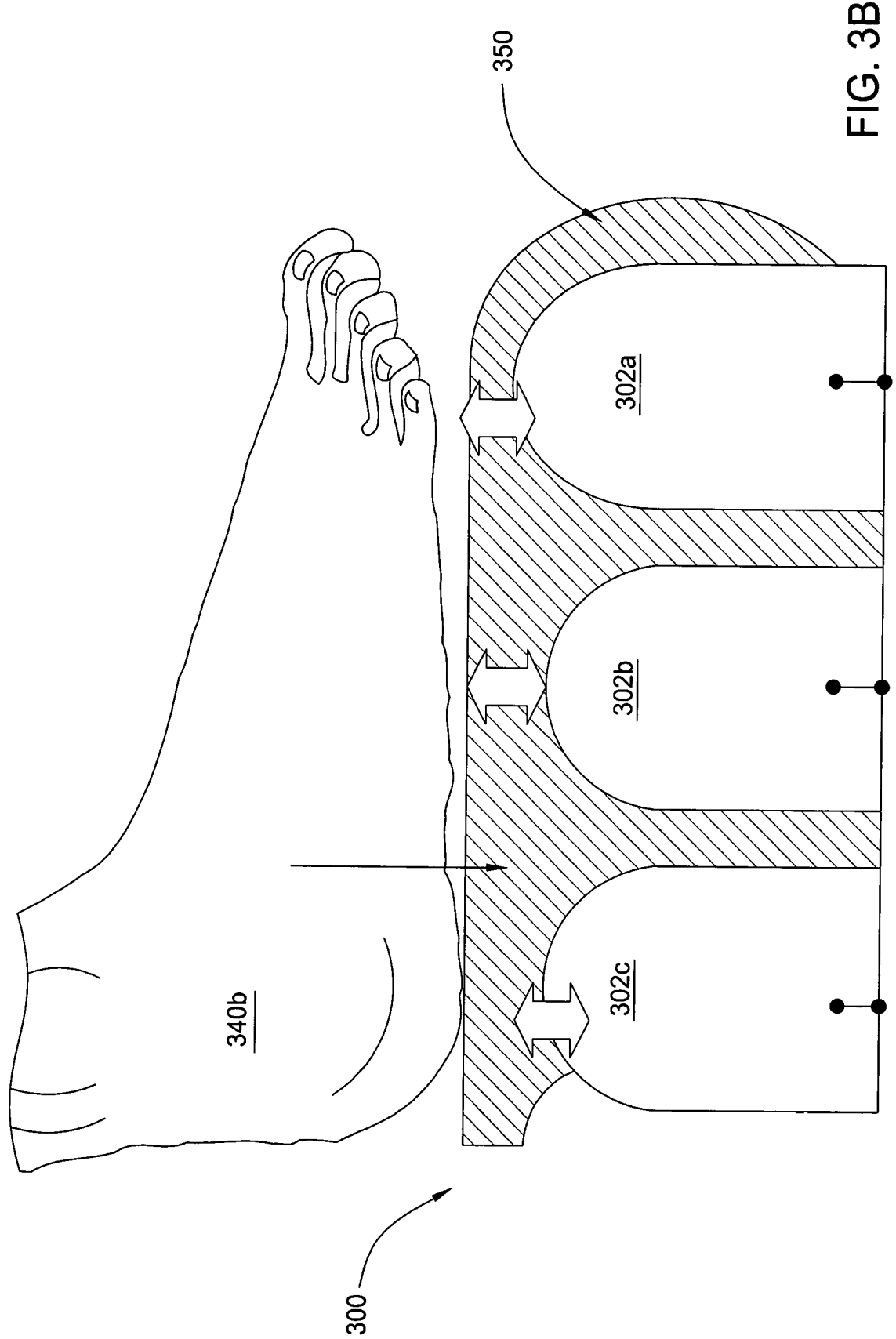

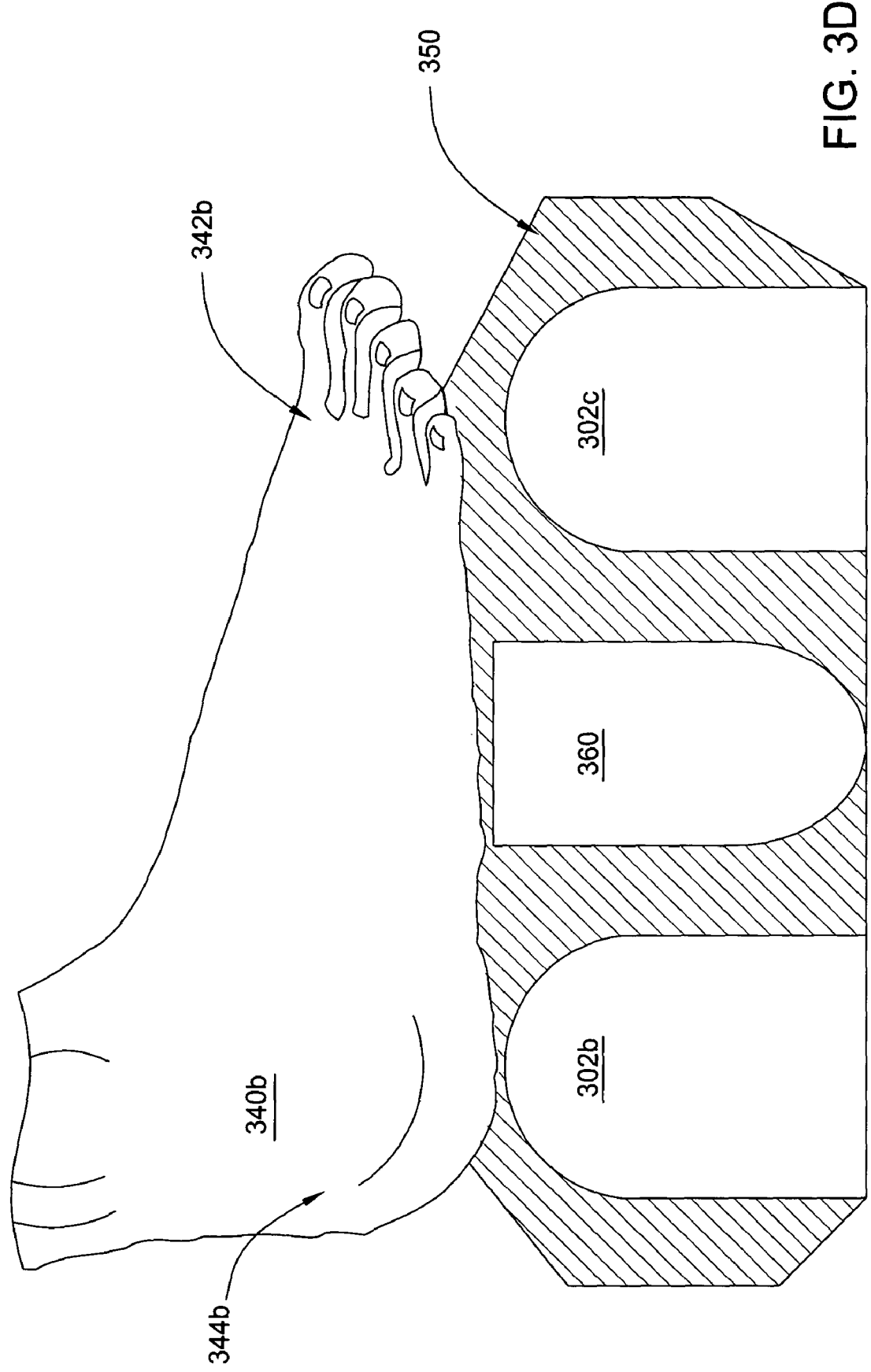

METHOD AND APPARATUS FOR REDUCING REPETITIVE MOTION INJURIES IN A COMPUTER USER

FIELD OF THE INVENTION

The present invention generally relates to the field of computers, and more particularly relates to a pointing device for use with a computer.

BACKGROUND OF THE INVENTION

Pointing devices for use with computers are well known. Existing pointing devices, such as mice and trackballs, combine tracking and selecting functions into one device. Tracking involves physically moving the mouse to control the motion of an on-screen pointer or other icon. Physical movement of the mouse is typically accomplished by moving the wrist and palm of the hand gripping the mouse. Once tracking has moved the pointer, an operation may be selected for execution by the computer, e.g., by depressing a button on the mouse or trackball.

A computer user relies significantly on his or her hand (particularly on the wrist, palm and fingers) to use a prior art pointing device for executing computer operations, and the user is required to have a certain level of hand/motor control. Unfortunately, a computer user with poor motor control, for example as a result of Parkinson's disease, or with poor eyesight, may have difficulty controlling his hand to position the pointer on-screen.

Repeated use of a conventional computer mouse can negatively impact even users with substantially unimpaired motor control. For instance, the use of a computer mouse over extended periods of time has been shown to be a leading cause of many different types of repetitive motion injuries (RMI) to body parts including the wrists, fingers, shoulders, and elbows, e.g., Carpal Tunnel Syndrome (CTS). Individuals in many fields of work rely on computers in their daily work and are thus forced to use a mouse quite extensively. Early injuries to children may even be incurable, rendering the injured child permanently disabled.

SUMMARY OF THE INVENTION

The present invention overcomes the above-described limitations of conventional technology by providing an improved pointing device in which the tracking and selecting functions are separated in that they are no longer part of a single, integrated device. This may be achieved by a tracking device adapted to generate a signal for use by a processor in moving a pointer on screen, and a physically separate selecting device adapted generate a selection signal for use by the processor to determine operations to execute. The tracking device and the selecting device are at least two distinct apparatuses and each may be separately operated by different user body parts. In exemplary embodiments of the invention, the improved pointing device may be operated at least in part by, for example, several of a user's fingers, by a foot, or by a user's eyes. The pointing device thus distributes conventional mouse functions in a way that allows them to be executed by multiple body parts, thereby reducing repeated stress to any single appendage.

BRIEF DESCRIPTION OF THE DRAWINGS

FIG. 2B is a perspective view of a second embodiment of a selecting device for use with the present invention;

FIG. 3A is a cross-sectional view of a fifth embodiment of a selecting device for use with the present invention;

FIG. 3B is a cross-sectional view of a sixth embodiment of a selecting device for use with the present invention;

To facilitate understanding, identical reference numerals have been used, where possible, to designate identical elements that are common to the figures.

DETAILED DESCRIPTION

Figure 1:
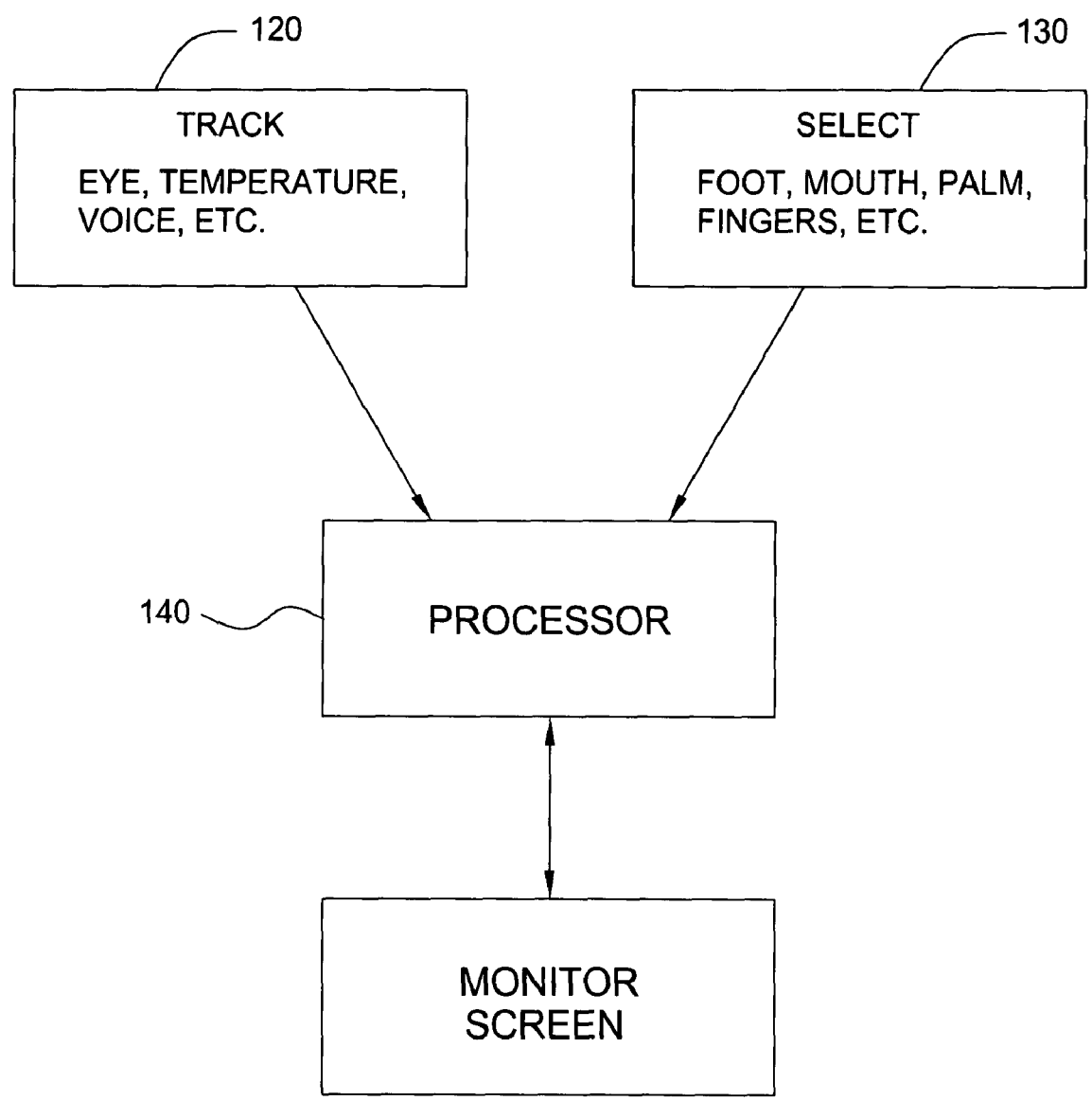
FIG. 1 is a schematic diagram illustrating the use of a pointing device according to one embodiment of the present invention.

The present invention provides an improved pointing device for assisting computer users having poor or limited hand/motor control and for reducing the occurrence of repetitive motion injuries in physically unimpaired users. As illustrated in FIG. 1, the present invention achieves this aim by splitting the two primary mouse functions, "track" 120 and "select" 130, into at least two distinct and physically separable devices, each of which is adapted to send a respective input signal to a single processor 140. Each of the devices is separately operable by a different user body part or parts. The invention is an improvement over prior art devices that consist of an integrated device that is adapted to execute both tracking 120 and selecting 130 via a single processor connection and that restricts operation to a single user body part (typically one hand). Embodiments of the invention execute tracking 120 and selecting 130 by means of improved devices that distribute the "track" 120 or "select" 130 operations over multiple body parts, rather than focusing motion on one or two primary areas, such as the hands and wrists. For example, tracking 120 may be accomplished by human eye cornea movement, while selecting 130 can be achieved by movement of the foot or multiple fingers. Embodiments of improved tracking 120 and selecting 130 devices will be described in further detail herein.

In one embodiment of the present invention, a selecting device includes a series of buttons or sensors that are adapted to be accessed by a variety of user body parts to indicate a selection. Sensors that may be used to advantage in the present invention include, but are not limited to, infrared, temperature and pressure actuator sensors. For example, model AD620B or the AD705J pressure sensors are commercially available from Analog Devices of Norwood, Mass. A separate tracking device, such as those described herein with reference to FIGS. 5–8, may be used to move the pointer on screen before indicating a selection.

In a first embodiment illustrated in FIG. 2A, the selecting device 200 includes a series of buttons or "beads" 202a–c (hereinafter collectively referred to as beads/buttons 202) mounted on a string or cable 204 and adapted to be activated by one or more of a user's fingers. Specifically, the embodiment illustrated constitutes a first end button 202a, a middle button 202b, and a second end button 202c. The first end button 202a is adapted to be used for "left click" operations, or operations normally executed by depressing a left mouse button on a conventional mouse (placed in the most readily accessible position because "left click" functions are the most frequently used); the middle button 202b is adapted to be used for "middle click" operations; and the second end button 202c is adapted to be used for "right click" operations. Although the embodiment illustrated utilizes three buttons 202 for selecting operations, it will by understood by those skilled in the art that less or more buttons 202 may be used to advantage depending on, for example, the hardware and operating system with which the pointing device interacts or the number or nature of appendages used to control the buttons 202. It should also be appreciated that the configuration of the "left click", "right click" and "middle click" buttons need not necessarily be arranged in the order illustrated; preferably, the buttons for the most commonly used functions should be placed in the locations most easily accessed by the user, and this may necessitate an alternate button configuration depending on the individual user.

Figure 2A:
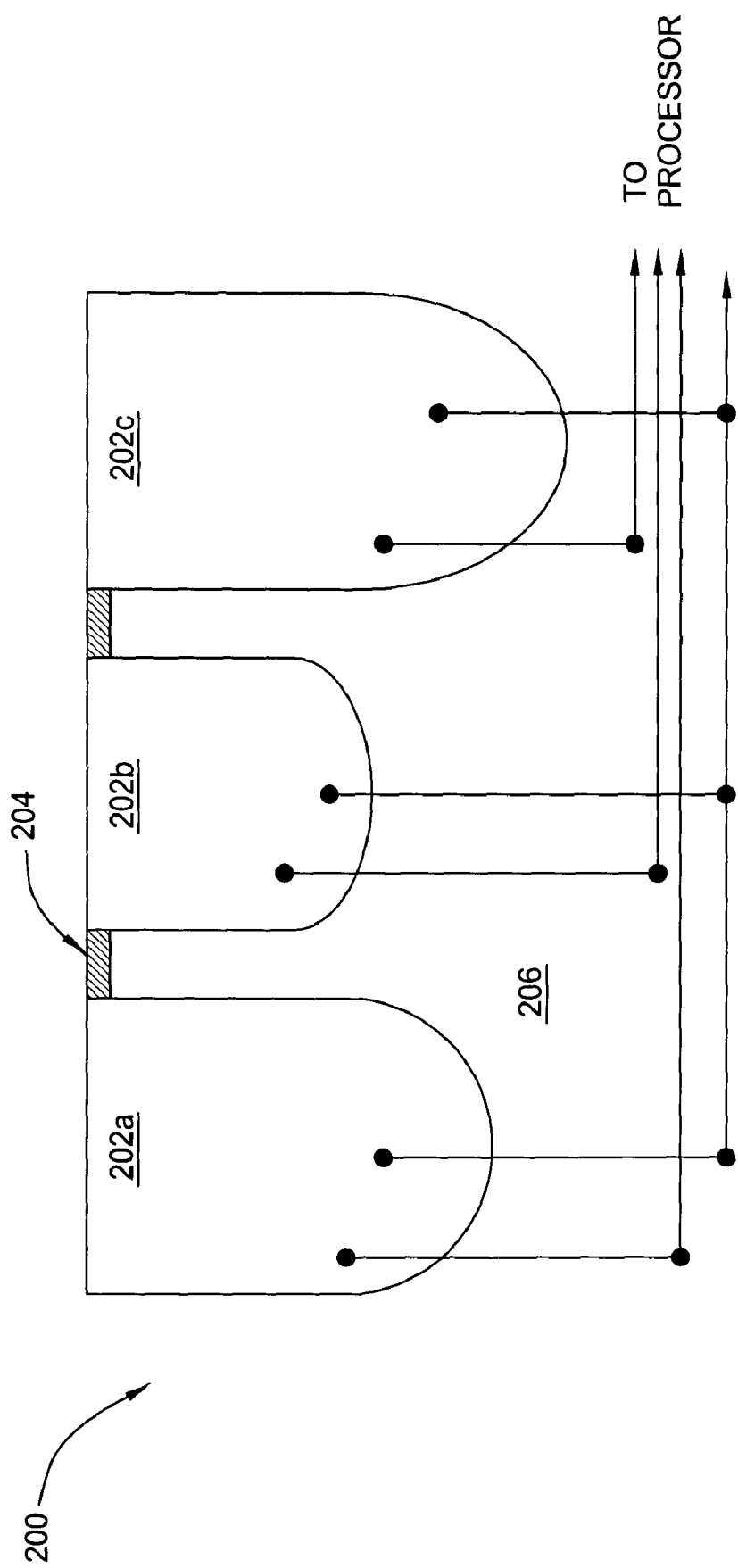
FIG. 2A is a perspective view of one embodiment of a selecting device for use with the present invention.
Figure 2C:
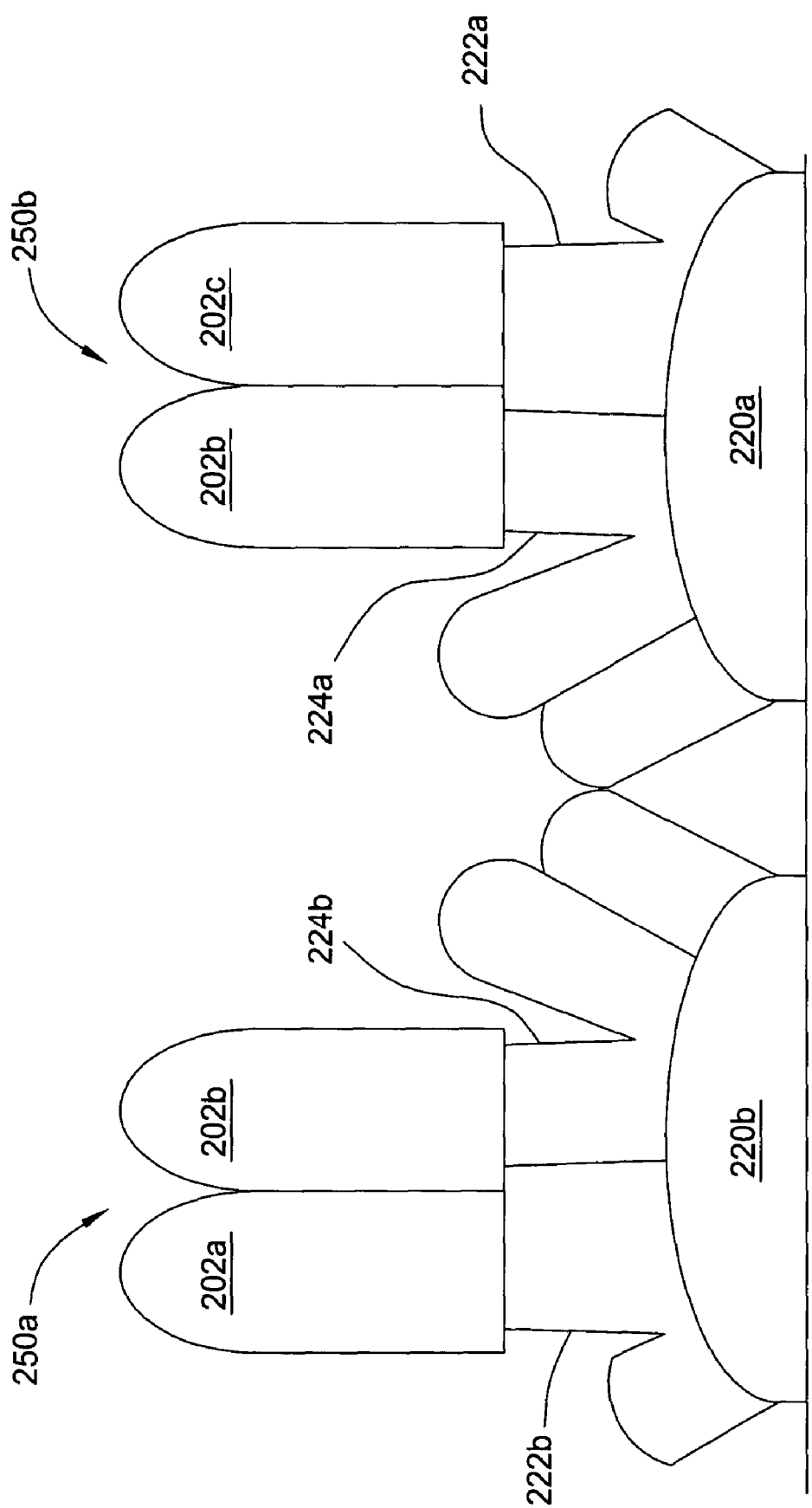
FIG. 2C is a perspective view of a third embodiment of a selecting device for use with the present invention.

The buttons 202 illustrated in FIG. 2A are adapted to be held by a computer user's fingers. For example, one or more fingers may be used in conjunction with any single button 202, as illustrated in FIG. 2B. Selecting operations are indicated by pressing a button 202 between a finger and a second surface 206, such as a tabletop. Alternatively, the button 202 may be pressed between a finger and a thumb or between a finger and another user body part. In the exemplary embodiment of FIG. 2B, the button connections are brought to the processor (140 in FIG. 1) along with power supply and ground, so that selections made by pressing or tapping a button 202 are sent as input. The buttons 202 may be solid devices that a user literally holds between a finger and a second surface 206, as illustrated in FIG. 2A, or may be hollow sheaths adapted to fit over a computer user's fingertips, as illustrated in FIG. 2C. Alternatively, a single sheath 210 adapted to fit over a single finger may allow the finger to access the entire series of buttons 202, as illustrated in FIG. 2B.

Figure 2D:
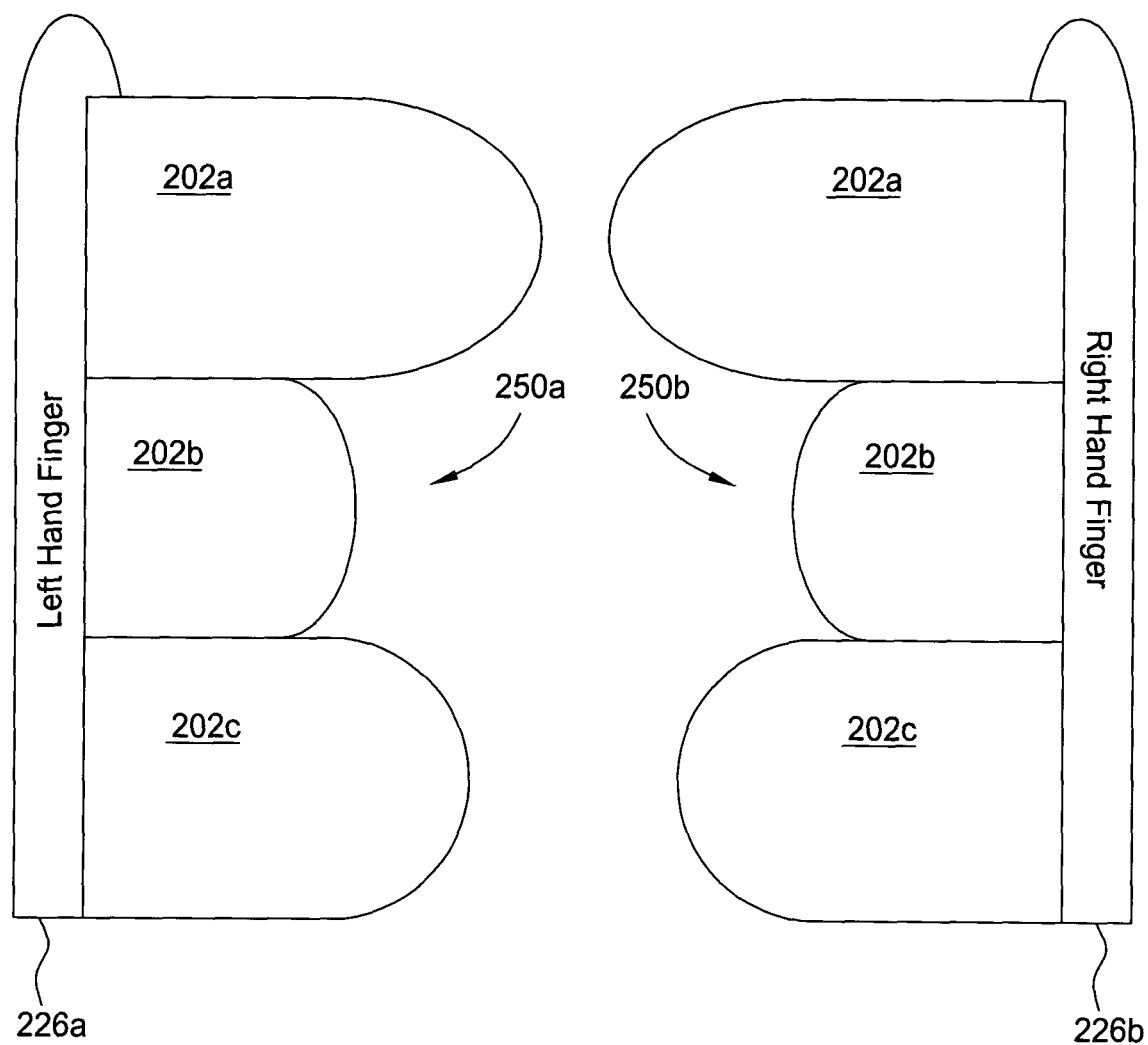
FIG. 2D is a perspective view of a fourth embodiment of a selecting device for use with the present invention.

As illustrated in FIG. 2C, the buttons 202 may be distributed over two hands; for example, a user's left hand 220a may control a first set of buttons 250a consisting in one embodiment of a first end button 202a (operable with a first finger 222a) and a middle button 202b (operable with a second finger 224a), and the user's right hand 220b may control a second set of buttons 250b, consisting in one embodiment of a second end button 202c (operable with a first finger 222b) and a middle button 202b (operable with a second finger 224b). However, such a configuration would require the use of at least four fingers 222a, 222b, 224a, 224b to control it, which may slow or hinder the user's typing as he or she switches from typing to selecting. Thus in a further embodiment (illustrated in FIG. 2D), the buttons 202 are not hollow sheaths, but are solid devices that are adapted to leave all of the user's fingers exposed for quick access to the computer keyboard. The buttons 202 may be spread over multiple fingers, or all may be adapted for control by a single finger 226 as illustrated. Each of the buttons in a single set 250a or 250b may be connected to each other, for example by a cable. Additionally, each set of buttons 250a and 250b is individually connected, for example remotely or by a cable, to the processor. A simple OR gate (not shown) at the processor input will allow selection of any one input for a particular button click action.

Although the embodiments described refer to the use of pressure sensor buttons 202 incorporated in the pointing device 200, it will be appreciated by those skilled in the art that temperature sensors (i.e., buttons that detect selection by the temperature differentials emanating from portions of a user's body in contact with the buttons) or infrared sensors (i.e., buttons that detect selection by sensing changes in the light intensity to which the buttons are directly exposed) may be used to advantage as well. However, if an infrared pointing device 200 is used, an infrared port in the computer or intermediary interface device will be necessary to facilitate proper interaction. Temperature sensors that may be advantageously adapted for use with the present invention include the TMP03 and TMP04 monolithic temperature detectors commercially available from Analog Devices.

In further embodiments, the individual buttons 202 may be colored differently to allow children and/or users with low cognitive actions to determine which buttons 202 execute which operations. Additionally or alternatively, buttons 202 may be sized differently to facilitate differentiation by users with low cognitive actions, as well as to facilitate use in poorly lit environments such as photography darkrooms and IC fabrication rooms. Furthermore, the buttons 202 may be incorporated in a piece of user worn apparel, such as a jacket.

FIG. 3A illustrates a second embodiment of the present invention, in which a selecting device 300 includes a series buttons 302 or switches that are adapted to be activated by a user's foot 340a or 340b (hereinafter collectively referred to as foot 340). The buttons 302 are substantially similar to the buttons 202 described with reference to FIGS. 2A–D; however, in order to facilitate operation by a user's foot, the buttons 302 may be formed larger than the buttons 202 and may be spaced or formed to enable access by different portions of the user's foot (i.e., the toes, the heel or the arch). The button connections are brought to the processor along with a power supply and ground, and the button arrangement may be configured in several different ways. For example, a selecting device 300 adapted for use by one foot 340, (i.e., all select operations are activated by the same foot) could include a first end button 302a used for "left click" operations (for example, placed, proximate a user's toes 342 because "left click" functions are the most frequently used); a middle button 302b used for "middle click" operations; and a second end button 302c used for "right click" operations (placed proximate a user's heel 344). Although the embodiment illustrated utilizes three buttons 302 for selecting operations, it will by understood by those skilled in the art that less or more buttons 302 may be used to advantage depending on, for example, the hardware and operating system with which the pointing device interacts or the number or nature of appendages used to control the buttons 302.

The pointing device 300 may be adapted so that a greater amount of pressure placed upon an individual button 302 relative to other buttons 302 indicates a selection of that individual button's operations. A lack of pressure on all buttons 302, followed by equal, simultaneous pressure on all (created, for example, by a momentary lifting of a user's foot 340), optionally indicates a selection of middle button 302b functions. Alternatively, the buttons 302 may be temperature switches rather than pressure switches, wherein a temperature differential (for example, caused by heat emanating from a portion of a user's foot 340 placed upon a button 302) indicates a selection.

Figure 3C:
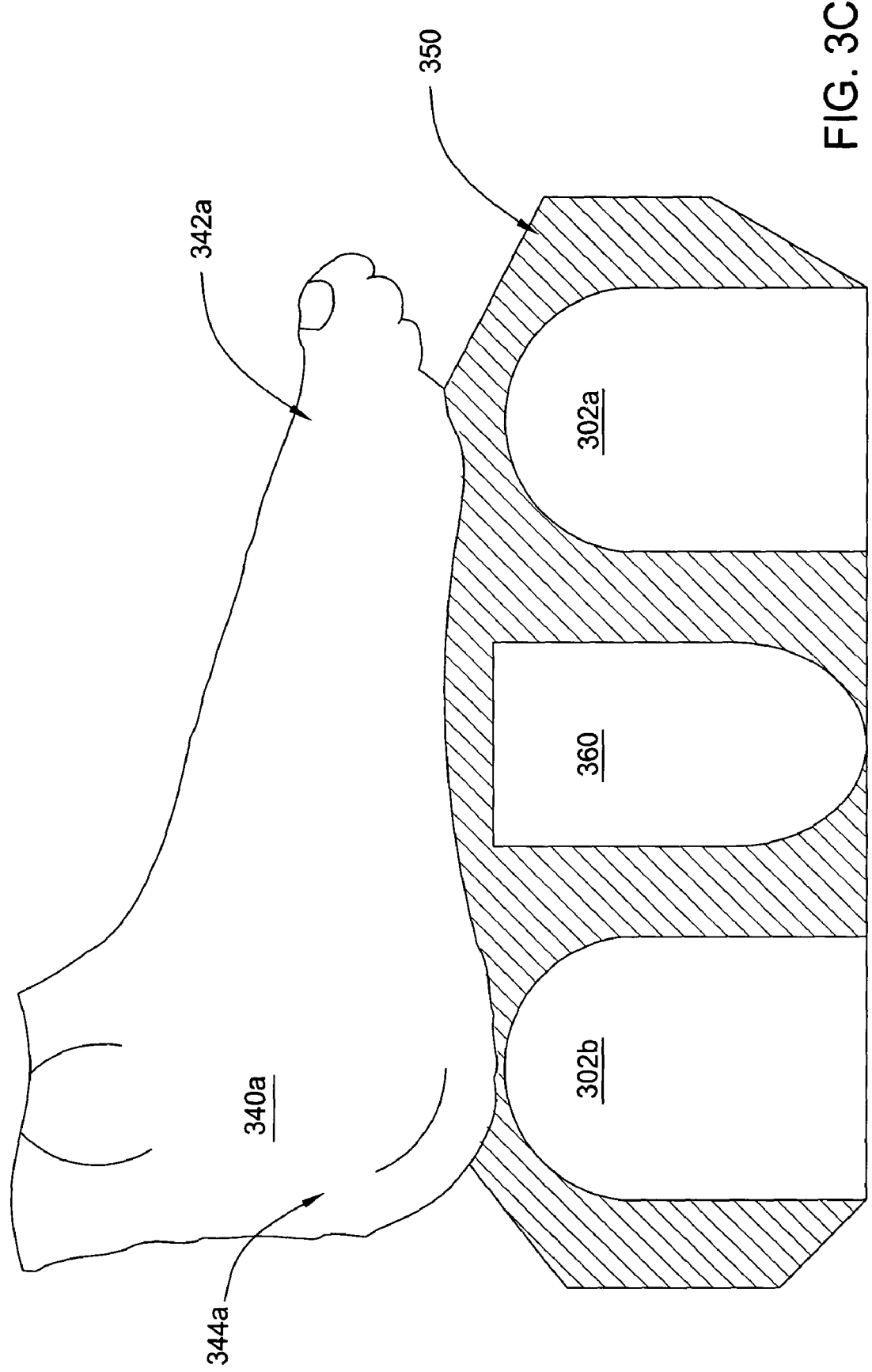
FIG. 3C is a cross-sectional view of a seventh embodiment of a selecting device for use with the present invention.

In another embodiment illustrated in FIG. 3C, the buttons may adapted to be activated by two feet 340a, 340b; for example, a user's left foot 340a could control a first end (or "left click") button 302a placed proximate the user's toes 342a, and a middle (or "middle click") button 302b placed proximate the heel 344a, with a rotational aid 360 placed therebetween. A right foot control may be configured similarly, with a second end (or "right click") button 302c placed proximate the toes 342b of the user's right foot 340b.

Selection buttons 302 may be incorporated into (a) a piece of clothing (for example, a boot or shoe), (b) a sheath that fits over at least a portion of the user's foot 340, or (c) a foot rest-like device 350 upon which the user's foot 340 may be placed. The former configuration may be adapted for activation by a knee, while the latter could be adapted for activation by the buttocks.

Figure 4:
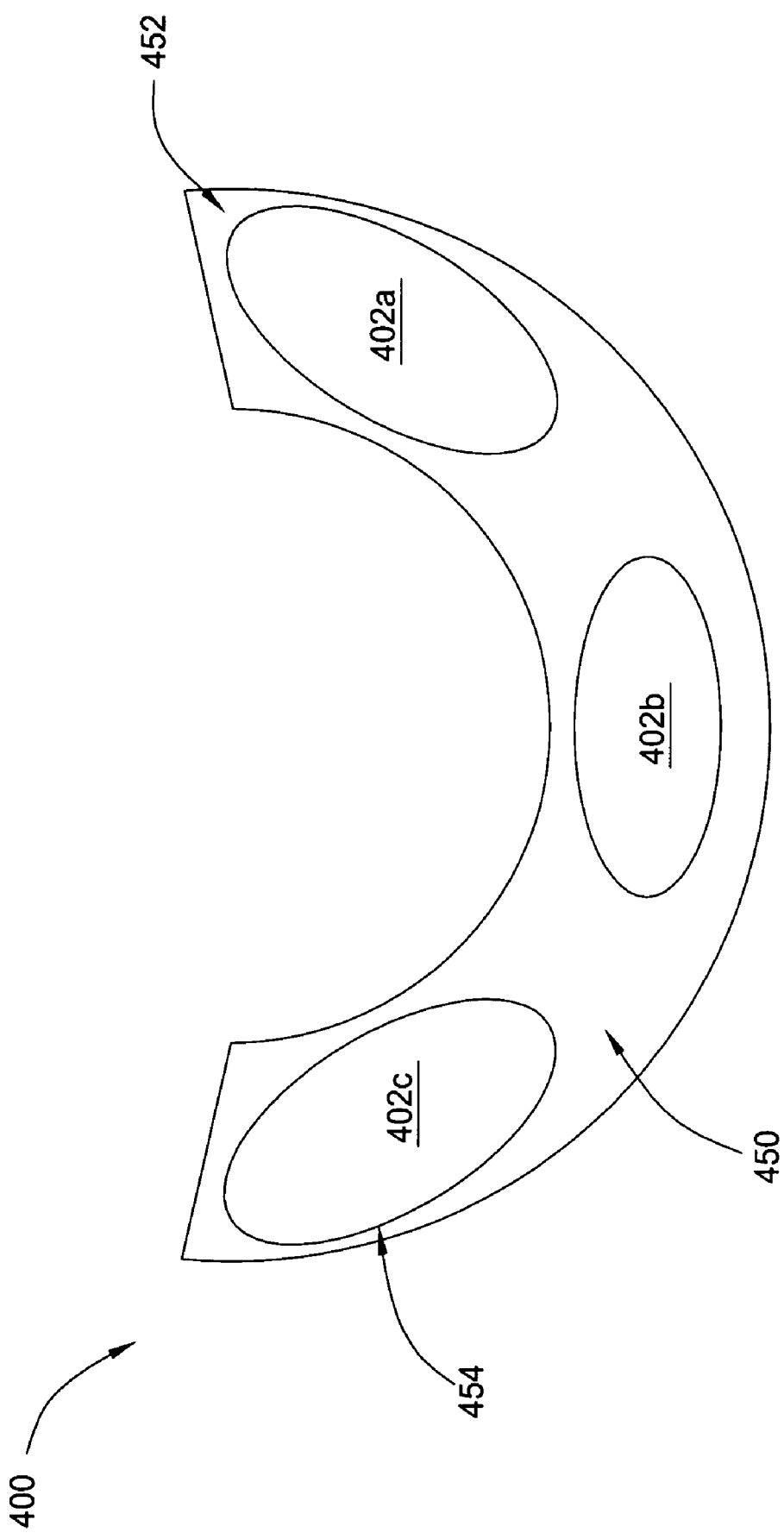
FIG. 4 is a perspective view of an eighth embodiment of a selecting device for use with the present invention.

In a third embodiment, selection buttons 402 may be adapted to be activated by a user's teeth, for example through incorporation into a mouth guard-like device 450 as illustrated in FIG. 4. In the embodiment illustrated, a selection device 400 includes a first end (or "left click") button 402a located on a portion of the device 400 to be inserted proximate the left side 452 of a mouth, a second end (or "right click") button 402c located on a portion of the device 400 to be inserted proximate the right side 454 of a mouth, and a middle (or "middle click") button 402b to be inserted proximate the front teeth. Although the embodiment illustrated utilizes three buttons 402 for selecting operations, it will by understood by those skilled in the art that less or more buttons 402 may be used to advantage depending on, for example, the hardware and operating system with which the pointing device interacts or the number or nature of appendages used to control the buttons 402. Selection may be made by applying differential pressure to any one button 402, for example by pinching the teeth over the button 402. Individual buttons 402 are hermetically sealed against saliva and the like to prevent short circuits and other problems, and may be composed of pressure based or piezoelectric material. The buttons 402 may generate signals in a user's mouth indicative of which button was pressed in order to be remotely connected to the processor.

In further embodiments, any of the selecting devices 200–400 described herein may be improved by using a wireless remote operation with a computer mouse port in order to free a user from wire entanglements. Remote mouse devices operating around 41 MHz (or any other remote frequencies permissible under law) are available commercially from Logitech of Fremont, Calif. However, in embodiments using multiple buttons for selecting, each button or group of buttons can be adapted to remotely exchange data with a PS/2 port. In such a case, the pointing device 200–400 may be button cell operated, and may be packaged in, for example in the case of the pointing device 200, a glove device similar to those used for home video game system controls.

As described previously herein, the selecting device 200–400 works in conjunction with a tracking device to select from a menu of command options on a computer screen. In one embodiment of the present invention, a tracking device is an outside source constituting an eye cornea edge motion detection (ECEMD) device. In a further embodiment, an ECEMD device includes a wired frame and image capturing device (such as video chip) that execute cursor movements and track functions.

Figure 5:
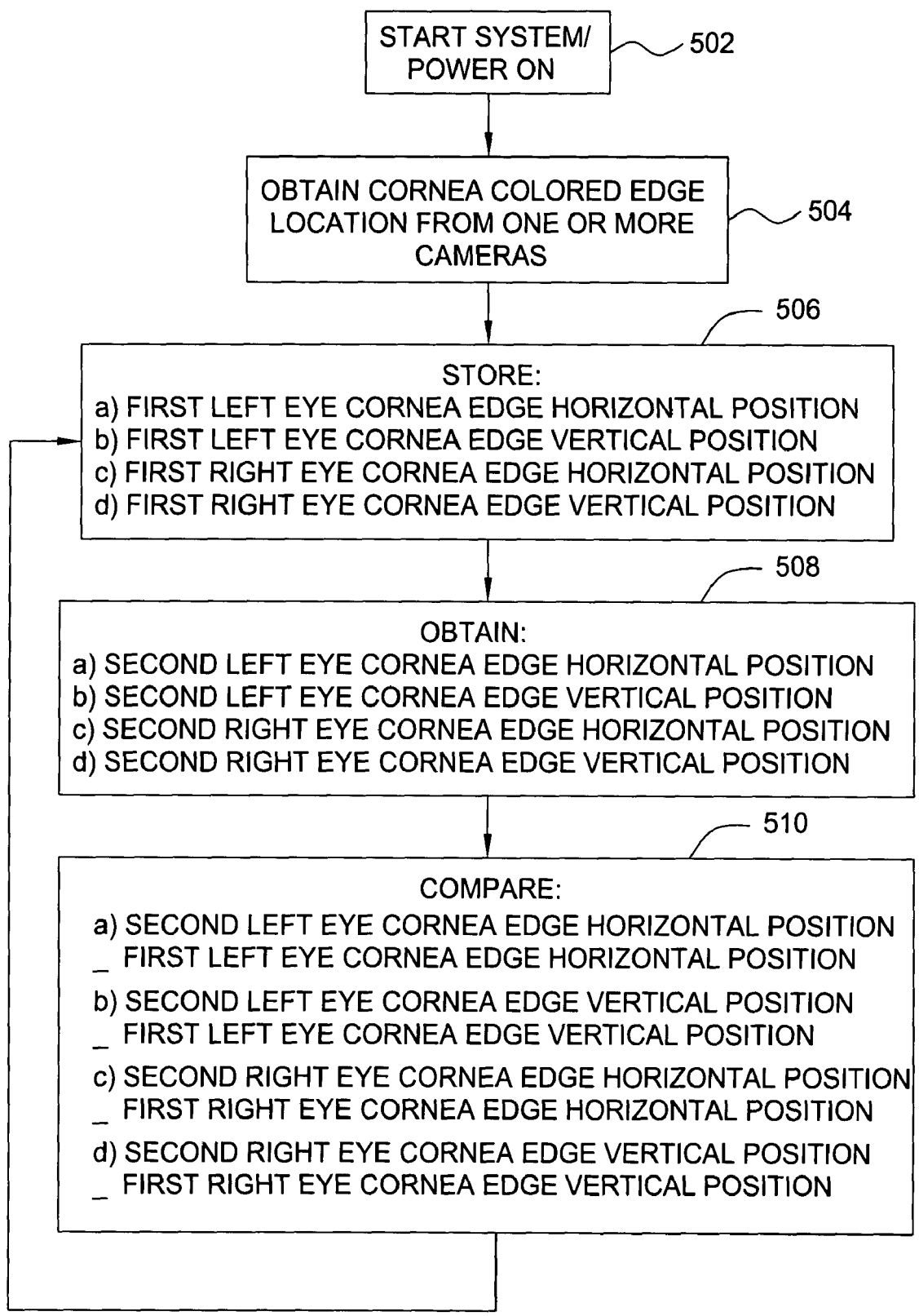
FIG. 5 illustrates an algorithm used by one embodiment of a tracking device for use with the present invention.

The functioning of an ECEMD device may be best understood with reference to FIG. 5. For each eye left and right, there are two pertinent axes of motion: horizontal and vertical. Thus, the algorithm illustrated in FIG. 5 compares current horizontal and vertical eye positions to stored horizontal and vertical eye positions to determine how the on-screen pointer should be moved. As illustrated in step 504, the ECEMD device relies on the curvature of at least one of a user's eyeballs to locate the position of the cornea and its edge. The arc of a user's cornea is easily detected due to its contrast against the white background of the eye. Once the corneas of the left and right eyes are located, the ECEMD device determines first horizontal and vertical positions for each cornea at a first set of coordinates, and these positions are stored by the processor to be used as reference points (step 506). As the user's eyes move, the ECEMD device captures second horizontal and vertical positions for each cornea at a second set of coordinates (step 508). The second horizontal and vertical positions are then compared to the stored first horizontal and vertical positions to determine the incremental horizontal and vertical displacements in the cornea locations (step 510). The ECEMD device then outputs to the processor these incremental horizontal and vertical displacements, which are translated by the processor into distances and directions of pointer motion. For example, if the second vertical position of the left eye is greater than the first vertical position of the left eye (i.e., step 510b yields a value greater than zero), the pointer will be moved upwards on-screen.

Once movement of the pointer has been executed according to the algorithm detailed in FIG. 5, the second horizontal and vertical positions of each cornea are stored. Steps 506–510 may then be optionally executed again using the second horizontal and vertical positions as new reference or "first" positions against a new "second" set of horizontal and vertical positions. A continuous loop of steps 506–510 allows a user to smoothly move or track the cursor over a computer screen simply by moving his or her eyes over the screen. The ECEMD device may be manually disabled by switch when needed, without removing the pointing device from its port.

A video chip for use with an ECEMD device has horizontal and vertical pixel resolution. The extreme left and extreme right eye cornea movements will give a certain eye cornea edge value in terms of pixels. If the number of pixels is, for example, 110×90 (vertical×horizontal), and the computer monitor screen resolution is 1100×900, this implies a one-to-ten ratio of pixels required for on screen pointer position.

Figure 6:
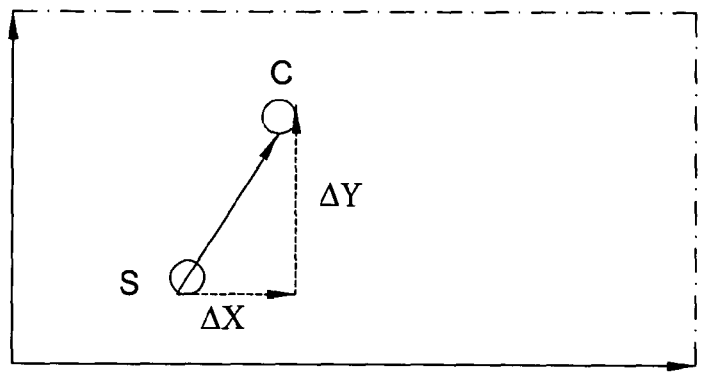
FIG. 6 is a graph representing the function of the tracking device described in FIG. 5.

FIG. 6 is a graph that visually illustrates the movement of a pointing device position according to the algorithm described in FIG. 5. The current value C as compared to the last value S for left and horizontal cornea edge gives a relative motion. The change in values ($\Delta X$ and $\Delta Y$) and direction [$\tan^{-1}(\Delta Y/\Delta X)$] of movement is predicted and the on screen pointer or cursor is moved accordingly.

Figure 7:
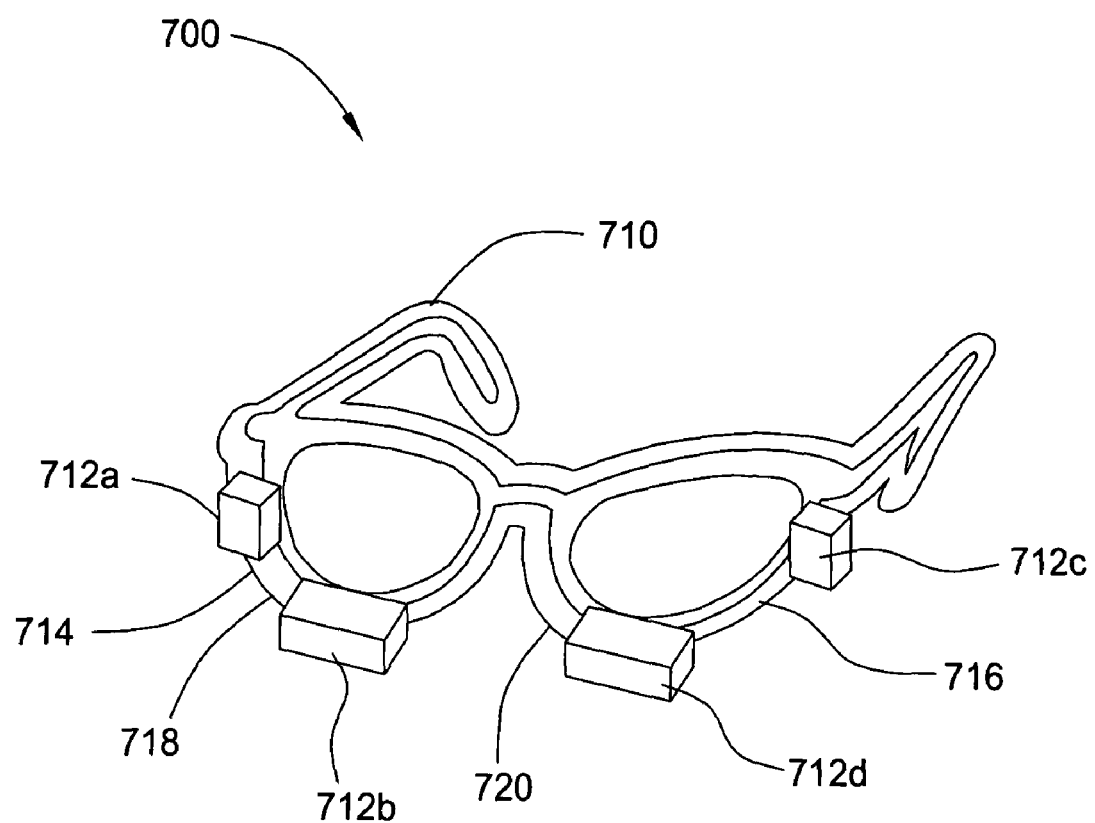
FIG. 7 is a first embodiment of the tracking device illustrated in FIGS. 5–6.

In one embodiment of a tracking device illustrated in FIG. 7, an ECEMD device 700 is incorporated in a frame 710 similar to a pair of eyeglasses, making the device 700 suitable for right- or left-handed users without modification. It will be appreciated that the ECEMD device 700 may be incorporated in any other device or apparel in which it may be adequately positioned to track cornea movement, such as goggles or a helmet or hat. The frame 710 includes at least one camera 712 per eye, and in the embodiment illustrated, four video-on-chip (VOC) cameras 712a, b, c, d (i.e., 2 cameras per eye) are installed at various positions on the frame 710. The cameras 712 may be flip open cameras, and they are positioned on locations on the frame 710 so as not to obstruct a user's view of the computer screen. For example, first and second cameras 712a, 712c may be installed on first and second sides 714, 716 of the frame, near the frame's outer periphery, so as to be positioned near the outer corners of each of a user's eyes. Second and third cameras 712b, 712d may be installed on lower edges 718, 720 of the frame so as to be positioned beneath each of a user's eyes. Cameras that may be advantageously adapted for use with the present invention include, but are not limited to, CMOS single chip cameras, as well cameras of the XGA, SVGA or MEGA-pixel type A separate selecting device, such as any one of the selecting devices illustrated in FIGS. 2–4, may be used to generate a selection signal once the ECEMD device 700 has moved the pointer to the desired on-screen location.

A power source such as a battery pack (not shown) and wires bringing power supply, ground and ECEMD output to a processor may be positioned behind or over a user's head, or on a tabletop device. Thus the ECEMD device 700 would be compatible with existing mouse ports such as a PS/2 on a desktop, laptop or palmtop device. A processing unit for the ECEMD device 700 may be a card in a PC, but it will need to be a dedicated single chip DSP having an input from each camera and output (incremental horizontal and vertical changes) to the processor.

Figure 8:
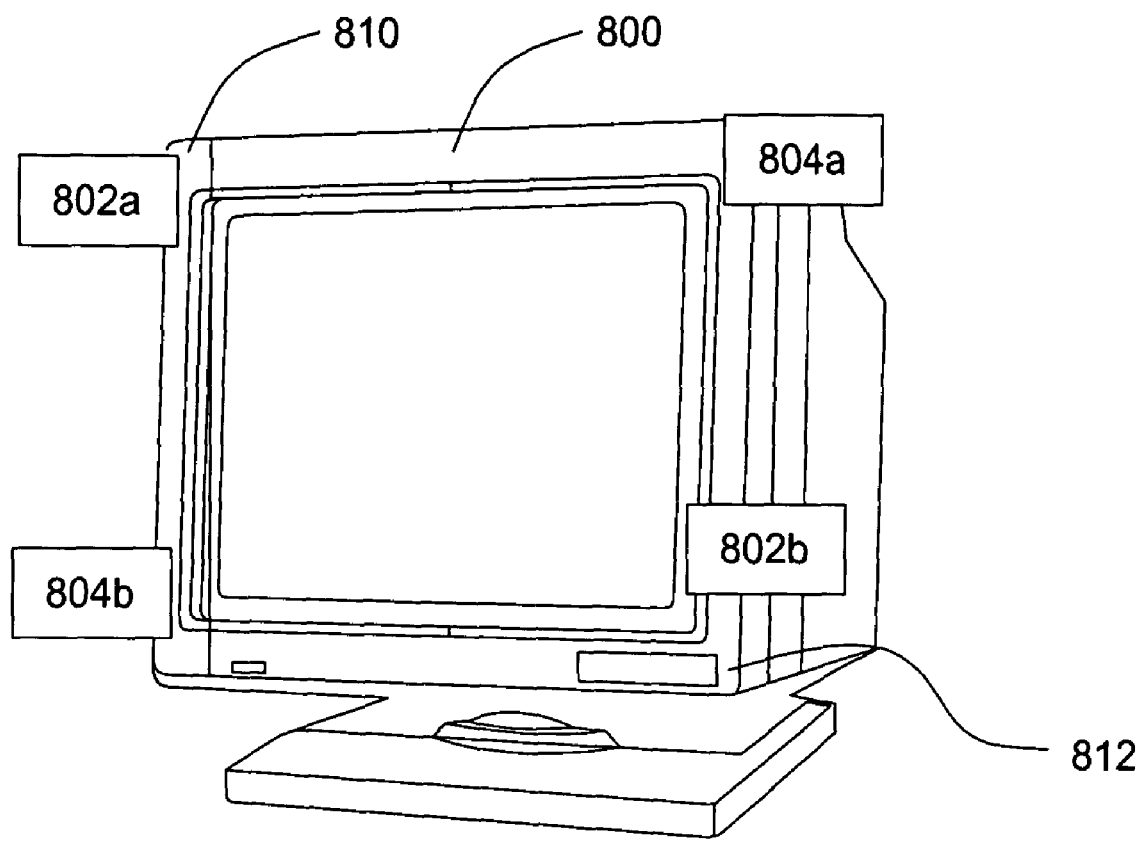
FIG. 8 is a second embodiment of the tracking device illustrated in FIGS. 5–6.

FIG. 8 illustrates a second embodiment of a tracking device, in which at least two sets of VOC cameras 802, 804 are positioned on a user's computer monitor 800, rather than in a device worn by the user. The cameras 802, 804 may be mounted onto the monitor 800, or built into the sides. A first set of cameras 802 includes at least two cameras 802a, 802b, one each mounted proximate opposite corners 810, 812 of the computer screen 800. A second set of cameras 804 includes at least two cameras 804a, 804b, one each mounted proximate the corners 816, 818 of the monitor on which the first set of cameras 802 is not mounted. The first set of cameras 802 monitors the location of a computer user's entire face, and the horizontal and vertical location values are used to position the second set of cameras 804 on the user's corneas.

A separate selecting device, such as any one of the selecting devices illustrated in FIGS. 2–4, may be used to generate a selection signal once the tracking device 800 has moved the pointer to the desired on-screen location.

Thus the present invention represents a significant advancement in the field of computer usage and computer pointing devices. A pointing device is provided that divides the primary functions of tracking and selecting into two distinct devices that are separately operable by different user body parts. The separate components are designed to allow users to employ multiple and various body parts to execute desired commands, substantially relieving the strain inflicted on a user's hands and wrists by conventional pointing devices.

While the foregoing is directed to embodiments of the invention, other and further embodiments of the invention may be devised without departing from the basic scope thereof, and the scope thereof is determined by the claims that follow.

What is claimed is:

1. A pointing device comprising:
   a tracking device adapted to generate a signal for use by a processor to move a pointer on a screen, wherein the tracking device comprises a device adapted to monitor a user's eye cornea edge movement, wherein the device adapted to monitor the user's eye cornea edge movement comprises at least one image capturing device, wherein the at least one image capturing device is adapted to capture images from the vantage point of a computer monitor, wherein the at least one image capturing device comprises:
      a first set of image capturing devices comprising at least one image capturing device adapted to monitor the location of a user's face; and
      a second set of image capturing devices comprising at least one image capturing device adapted to monitor the location of a user's eye cornea edges; and
   a selecting device adapted to generate a signal for use by the processor to select operations to execute,
      wherein the tracking device and the selecting device are respectively incorporated into at least two distinct and physically separable apparatuses that are separately operable by different user body parts.

2. The pointing device of claim 1, wherein the selecting device comprises one or more sensors adapted to generate an input to the processor.

3. The pointing device of claim 2, wherein the one or more sensors comprises at least one of a pressure, temperature or infrared sensor.

4. The pointing device of claim 2, wherein the one or more sensors is incorporated into a device adapted to be worn by a user.

5. The pointing device of claim 2, wherein the one or more sensors comprises a series of buttons adapted to be held between at least one user finger and a second surface.

6. The pointing device of claim 5, wherein the series of buttons comprises:
   a first button; and
   a second button,
   wherein the first and second buttons are adapted for access by a single user hand.

7. The pointing device of claim 6, wherein the series of buttons further comprises a middle button positioned between the first and second buttons.

8. The pointing device of claim 5, wherein the second surface is at least one of a thumb, flat surface or another user body part.

9. The pointing device of claim 2, wherein the one or more sensors comprises a series of buttons adapted to be held between a first finger and a second finger.

10. The pointing device of claim 2, wherein the one or more sensors comprises a series of buttons adapted to be activated by a user's foot.

11. The pointing device of claim 10, wherein the series of buttons comprises:
   a first button; and
   a second button,
   wherein the first and second buttons are adapted for access by a single user foot.

12. The pointing device of claim 11, wherein the series of buttons further comprises a middle button positioned between the first and second buttons.

13. The pointing device of claim 10, wherein the series of foot activated buttons comprises:
   a first series of buttons adapted for access by a first foot; and
   a second series of buttons adapted for access by at least one of the first foot or a second foot,
   wherein the first and second series of buttons separately coupled to the circuit board.

14. The pointing device of claim 2, wherein the one or more sensors comprises a series of buttons adapted to be activated by a user's teeth.

15. The pointing device of claim 14, wherein the series of teeth-activated buttons is incorporated in a mouth guard or mouth guard-like device.

16. The pointing device of claim 1, wherein the at least one image capturing device is a video camera.

17. The pointing device of claim 1, wherein the at least one image capturing device is incorporated into a frame adapted to be worn over the user's eyes.

18. A pointing device comprising:
a tracking device adapted to send pointer motion and location information to a processor and comprising a temperature sensor; and
a selecting device coupled to the processor and comprising at least one device adapted to monitor a user's eye cornea edge movement,
wherein the tracking device and the selecting device are respectively incorporated into at least two distinct and physically separate apparatuses that are separately operable by different user body parts.

19. A pointing device comprising:
a tracking device adapted to generate a signal for use by a processor to move a pointer on a screen; and
a selecting device adapted to generate a signal for use by the processor to select operations to execute, wherein the selecting device comprises one or more sensors adapted to generate an input to the processor, wherein the one or more sensors comprises a series of buttons adapted to be activated by a user's foot, wherein the series of foot activated buttons comprises:
a first series of buttons adapted for access by a first foot; and
a second series of buttons adapted for access by at least one of the first foot or a second foot,
wherein the first and second series of buttons separately coupled to the circuit board,
wherein the tracking device and the selecting device are respectively incorporated into at least two distinct and physically separate apparatuses that are separately operable by different user body parts.

20. A computer system comprising:
a processor;
a tracking device adapted to send pointer movement and location data to the processor; and
a selecting device adapted to send pointer operation data to the processor, wherein the selecting device comprises one or more sensors adapted to generate an input to the processor, wherein the one or more sensors comprises at least one of a temperature or infrared sensor,
wherein the tracking device and the selecting device are respectively incorporated into at least two distinct and physically separate apparatuses that are separately operable by different user body parts.

21. (I) The computer system of claim 20, wherein the one or more sensors comprises a pressure sensor.

22. The computer system of claim 21, wherein the tracking device comprises a device that is adapted to monitor a user's eye cornea edge movement.

23. The computer system of claim 22, wherein the device adapted to monitor a user's eye cornea edge movement comprises at least one image capturing device.

24. A method for executing computer commands, comprising the steps of:
sending pointer movement data to a processor, wherein the step of sending pointer movement data comprises:
capturing an initial image of a user's eye cornea edges;
storing horizontal and vertical cornea location information garnered from the initial captured image;
capturing a subsequent image of the user's eye cornea edges;
contrasting the horizontal and vertical cornea location information garnered from the subsequent captured image with the stored location information garnered from the initial captured image to determine horizontal and vertical cornea displacements; and
sending the horizontal and vertical displacement data to the printed circuit board; and
sending operation selection data to the processor,
wherein the pointer movement data and the operation selection data are sent by operating at least two distinct and physically separate apparatuses that are separately operable by different user body parts.

25. The method of claim 24, wherein the pointer device is moved on a computer screen according to the horizontal and vertical cornea displacements data send to the processor.

26. The method of claim 24, wherein the step of sending operation selection data comprises activating at least one sensor adapted to send pointer command information to the processor.

27. The method of claim 26, wherein the step of activating at least one sensor is performed by at least one of a finger, foot, mouth, knee or buttock.

28. (II) An apparatus comprising:
a first device, for generating a tracking signal in response to a first user manipulation, wherein the first device comprises:
a first set of image capturing devices comprising at least one image capturing device adapted to monitor the location of a user's face; and
a second set of image capturing devices comprising at least one image capturing device adapted to monitor the location of a user's eye cornea edges; and
a second device, for generating a selection signal in response to a second user manipulation, wherein said tracking and selection signals are adapted to enable, respectively, tracking and selection functions within a graphical user interface, said first device and said second device being respectively incorporated into at least two distinct and physically separate devices.

* * * * *